(12) United States Patent
Ou

(10) Patent No.: US 8,774,949 B2
(45) Date of Patent: Jul. 8, 2014

(54) HYBRID INTELLIGENT CONTROL METHOD AND SYSTEM FOR POWER GENERATING APPARATUSES

(75) Inventor: Ting-Chia Ou, Taoyuan County (TW)

(73) Assignee: Institute of Nuclear Energy Research Atomic Energy Council, Executive Yuan, Taoyuan County (TW)

( * ) Notice: Subject to any disclaimer, the term of this patent is extended or adjusted under 35 U.S.C. 154(b) by 420 days.

(21) Appl. No.: 13/272,328

(22) Filed: Oct. 13, 2011

(65) Prior Publication Data
US 2013/0085621 A1 Apr. 4, 2013

(30) Foreign Application Priority Data
Oct. 4, 2011 (TZ) ................................ 100135909 A

(51) Int. Cl.
*B63H 3/10* (2006.01)
*F03D 7/02* (2006.01)
*F03D 7/04* (2006.01)
*G06N 5/04* (2006.01)

(52) U.S. Cl.
CPC ................ *F03D 7/0224* (2013.01); *F03D 7/04* (2013.01); *Y02E 10/725* (2013.01); *Y02E 40/76* (2013.01); *Y04S 10/545* (2013.01); *G06N 5/04* (2013.01); *G06N 5/048* (2013.01)
USPC ................ 700/48; 700/50; 700/54; 700/287; 700/290; 290/44; 290/55; 706/4; 706/8; 706/10; 706/15; 416/27

(58) Field of Classification Search
CPC .... Y02E 10/723; H02P 2009/004; B63H 3/10
USPC ........... 290/44, 55; 700/48, 50, 54, 287, 290; 706/4, 8, 10, 15, 25–26; 416/27
See application file for complete search history.

(56) References Cited

U.S. PATENT DOCUMENTS 5,652,485 A * 7/1997 Spiegel et al. ................ 318/147
6,711,556 B1 * 3/2004 Sepe et al. ........................ 706/6

(Continued)

OTHER PUBLICATIONS

Pitch angle control in wind turbines above the rated wind speed by multi-layer perceptron and radial basis function neural networks; Yilmaz et al.; 9 pages. Copyright 2009; printed from Internet on Jan. 27, 2014.*

(Continued)

*Primary Examiner* — Ronald Hartman, Jr.
(74) *Attorney, Agent, or Firm* — WPAT, PC; Justin King

(57) ABSTRACT

A present invention relates to a novel hybrid intelligent control system and method for power generating apparatuses, in which the control system comprises: a fuzzy sliding mode speed controller, embedded with a fuzzy inference mechanism so as to be used for controlling the speed of a power generating apparatus; and a radial basis function network (RBFN) pitch controller, being embedded with an on-line training RBFN so as to be used for controlling the pitch angle of a turbine coupled to the power generating apparatus. In a variable-speed energy conversion system using the aforesaid control system, the turbine can be driven to operate at its maximum efficiency by adjusting its blade pitch angle in response to the variation of the input flowing into the turbine, while allowing the shaft speed of the power generating apparatus to be controlled by a fuzzy interference mechanism so as to achieve its maximum power output.

28 Claims, 6 Drawing Sheets

(56) References Cited

U.S. PATENT DOCUMENTS

| | | | | |
|---|---|---|---|---|
| 7,939,961 | B1* | 5/2011 | Bonnet | 290/55 |
| 2010/0127495 | A1* | 5/2010 | Egedal et al. | 290/44 |
| 2013/0140819 | A1* | 6/2013 | Abdallah et al. | 290/44 |

OTHER PUBLICATIONS

Dynamic Analysis of Wind Turbine Blades Using Radial Basis Functions; Ming-Hung Hsu; 12 pages; Published Apr. 2011; printed from Internet on Jan. 27, 2014.*

Hybrid Fuzzy Control Strategies for Variable Speed Wind Turbines; published in Automatic Control and Robotics; vol. 10, No. 2, 2011, pp. 205-217; Ivan Ćirić et al., received Nov. 18, 2011, 13 pages.*

Pitch Angle Control of Variable Low Rated Speed Wind Turbine Using Fuzzy Logic Controller; International Journal of Engineering & Technology IJET-IJENS vol. 10 No. 5; A. Musyafa et al.; 4 pages.*

Research on the Intelligent Control Strategy Based on Improved FNNC for Hydraulic Turbine Generating Units; 2009 International Conference on Artificial Intelligence and Computational Intelligence; Shuqing Wang et al.; 5 pages.*

Dynamic control of wind turbines; Kusiak A, et al., Dynamic control of wind turbines, Renewable Energy (2009), doi:10.1016/j.renene.2009.05.022; 8 pages.*

Neural Network-Based Fuzzy Predictive Current Control for Doubly Fed Machine; 2009 IITA International Conference on Control, Automation and Systems Engineering; Zongkai Shao et aL; 4 pages.*

* cited by examiner

HYBRID INTELLIGENT CONTROL METHOD AND SYSTEM FOR POWER GENERATING APPARATUSES

FIELD OF THE INVENTION

The present invention relates to a novel hybrid intelligent control system and method for power generating apparatuses, such as a permanent magnet synchronous generator (PMSG), and more particularly to a power generating system adapted for enabling a turbine to operate at its maximum efficiency by adjusting its blade pitch angle in response to the variation of an input flowing into the turbine, while allowing the shaft speed of a power generating apparatus to be controlled by a fuzzy interference mechanism so as to achieve its maximum power output.

BACKGROUND OF THE INVENTION

Recently, green energy generation systems, such as wind power generation systems that are capable of harvesting wind power to be used for producing electricity without emissions, beginning to attract more and more attentions as they can be used as clean and safe renewable power sources. Taking the power generation system of the prime mover for instance, it can be designed to operate in either a constant-speed mode or a variable-speed mode for producing electricity through the conversion of power electronic converters. Among which, the variable-speed generation system is more attractive than the fixed-speed system because of the improvement in energy production and the reduction of the flicker problem. In addition, the turbine in the variable-speed generation system can be operated at the maximum power operating point for various speeds by adjusting the shaft speed optimally to achieve maximum efficiency. All these characteristics are advantages of the variable-speed energy conversion systems. Nevertheless, in order to achieve the maximum power control, some control schemes have been studied.

Many generators of research interests and for practical use in generation are induction machines with wound-rotor or cage-type rotor. Recently, the interest in permanent magnet synchronous generator (PMSG) is increasing. The desirable features of the PMSG are its compact structure, high air-gap flux density, high power density, high torque-to-inertia ratio, and high torque capability. Moreover, compared with an induction generator, a PMSG has the advantage of a higher efficiency, due to the absence of rotor losses and lower no-load current below the rated speed; and its decoupling control performance is much less sensitive to the parameter variations of the generator. Therefore, using a PMSG, a high-performance variable-speed generation system with high efficiency and high controllability can be expected.

There are already many related studies available today. To name a few, one such prior study proposed a power generation system with neural network principles applied for speed estimation and PI control for maximum power extraction, using which the mechanical power of the turbine can be well tracked for both dynamic and steady state, but the power deviation and speed tracking errors are large with transient response for almost 20 seconds. Another prior study proposed the development of a cascaded nonlinear controller for a variable-speed wind turbine equipped with a DFIG, but the rotor speed errors are large with efficiency around 70%. Further, there is a study proposed an advanced hill-climb searching method taking into account the wind-turbine inertia. However, it required an additional intelligent memory method with an on-line training process, and maximum error of power coefficient is about 23%. In addition, another prior study proposed an output maximization control without mechanical sensors such as the speed sensor and position sensor, but the ac power output efficiency is only around 80%. Furthermore, there are three sensorless control methods, which are the wind prediction, fixed voltage scheme for inverter, and current-controlled inverter, presented in is further another prior study, but it is disadvantageous in that: the fixed voltage scheme does not vary with the load to match the maximum power line of the wind turbine generator, and results in low conversion efficiency when the wind speed is above or below the given range attained. Moreover, there are two methods developed in another prior study which are provided to adjust the aerodynamic power: pitch and generator load control, both of which are employed to regulate the operation of the wind turbine, but are disadvantageous in that: the power coefficient deviation is too large.

Therefore, it is in need of a novel hybrid intelligent control system and algorithm for a power generating apparatus, such as a PMSG, capable of optimizing the performance of the power generating apparatus by performing a speed control using a sliding mode controller combined with fuzzy inference mechanism and adaptive algorithm, and also by performing a pitch control upon a turbine coupled to the power generating apparatus using pitch controller embedded with a RBFN algorithm. Moreover, in the sliding mode controller, a switching surface with an integral operation is designed. Operationally, when the sliding mode occurs, the system dynamic behaves as a robust state feedback control system, and in a general sliding mode control, the upper bound of uncertainties, including parameter variations and external mechanical disturbance, must be available. However, the bound of the uncertainties is difficult to obtain in advance for practical applications. Thus, a fuzzy sliding speed controller is investigated to resolve the above difficulty, in which a simple fuzzy inference mechanism is utilized to estimate the upper bound of uncertainties. Furthermore, to reduce the control effort of the sliding mode speed controller, the fuzzy inference mechanism is improved by adapting the center of the membership functions to estimate the optimal bound of uncertainties.

SUMMARY OF THE INVENTION

In view of the disadvantages of prior art, the primary object of the present invention is to provide a novel hybrid intelligent control system and method for a power generating apparatus, such as a permanent magnet synchronous generator (PMSG), adapted for enabling a turbine that is coupled to the power generating apparatus to operate at its maximum efficiency by adjusting its blade pitch angle in response to the variation of any input flowing into the turbine, while allowing the speed of the power generating apparatus to be controlled by a fuzzy interference mechanism so as to achieve its maximum power output.

To achieve the above object, the present invention provides a novel hybrid intelligent control system for a power generating apparatus, such as a permanent magnet synchronous generator (PMSG), which comprises: a fuzzy sliding mode speed controller, being embedded with a fuzzy inference mechanism so as to be used for controlling the speed of a power generating apparatus; and a radial basis function network (RBFN) pitch controller, being embedded with an on-line training RBFN so as to be used for controlling the pitch angle of a turbine coupled to the PMSG; wherein the turbine is driven to operate at its maximum efficiency by adjusting its blade pitch angle in response to the variation of a flow input into the turbine, while allowing the speed of the power generating apparatus to be controlled by a fuzzy inference mechanism so as to achieve its maximum power output.

In an embodiment, the present invention provides a novel hybrid intelligent control method for a permanent magnet synchronous generator, which comprises the steps of: using a fuzzy sliding mode speed controller that is embedded with a fuzzy inference mechanism, for controlling the speed of a power generating apparatus; and using a radial basis function network (RBFN) pitch controller, that is embedded with an on-line training RBFN, for controlling the pitch angle of a turbine coupled to the power generating apparatus.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
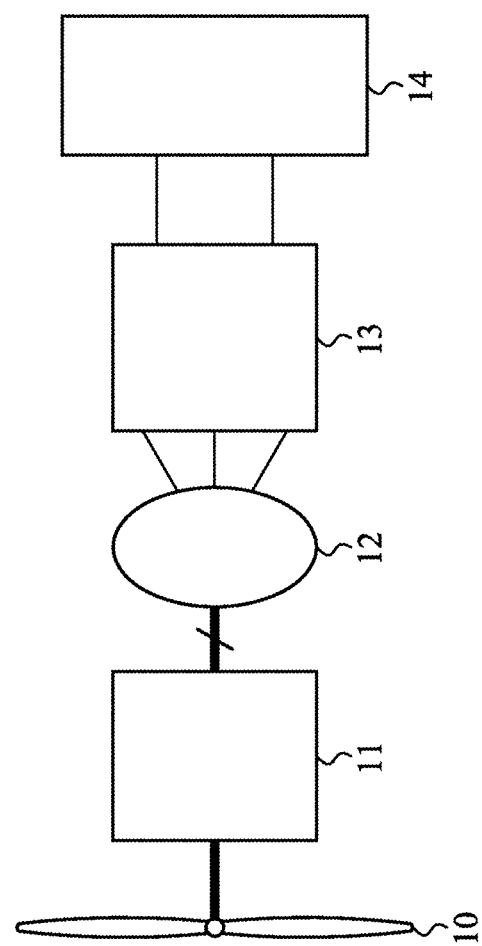
FIG. 1 is a schematic diagram showing an exemplary power generation system configuration of the present invention.

Please refer to FIG. 1, which is a schematic diagram showing an exemplary power generation system configuration of the present invention. It is noted that although the power generation system shown in FIG. 1 uses a wind turbine 10 as its energy harvesting device, it is not limited thereby, and thus can be a turbine capable of capturing energy of any input flowing therein. As shown in FIG. 1, the input of a wind turbine 10 is the wind and the output is the mechanical power for turning the shaft of a power generating apparatus 12, such as a PMSG that is coupled to the wind turbine 10 through a gear box 11. Operationally, the wind power $P_w$ is harvested by the wind turbine so as to be converted into the output mechanical power $P_m$ for driving the shaft of the PMSG 12 to rotate through the coupling of the gear box 11, and thus enabling the same to produce electricity $P_e$ that is to be converted by a power converter 13 into $P_{dc}$ so as to be fed to a dc load 14 or a dc power grid 14. In this embodiment, a variable-speed wind turbine 10 is used as the energy harvesting device in the wind power generation system shown in FIG. 1, by that the output mechanical power available from a wind turbine could be expressed as:

$$P_m = \tfrac{1}{2}\rho A C_p(\lambda,\beta)V_\omega^3; \qquad (1)$$

wherein $\rho$ and A are air density and the area swept by blades, respectively;

$V_\omega$ is the wind velocity (m/sec); and $C_p$ is the power coefficient.

The power coefficient $C_p$ is given as a nonlinear function of the tip speed ratio (TSR) $\lambda$ in an equation:

$$\lambda = \frac{\omega_r r}{V_\omega} \qquad (2)$$

wherein r is the wind turbine blade radius; and $\omega_r$ is the turbine speed.

Figure 2:
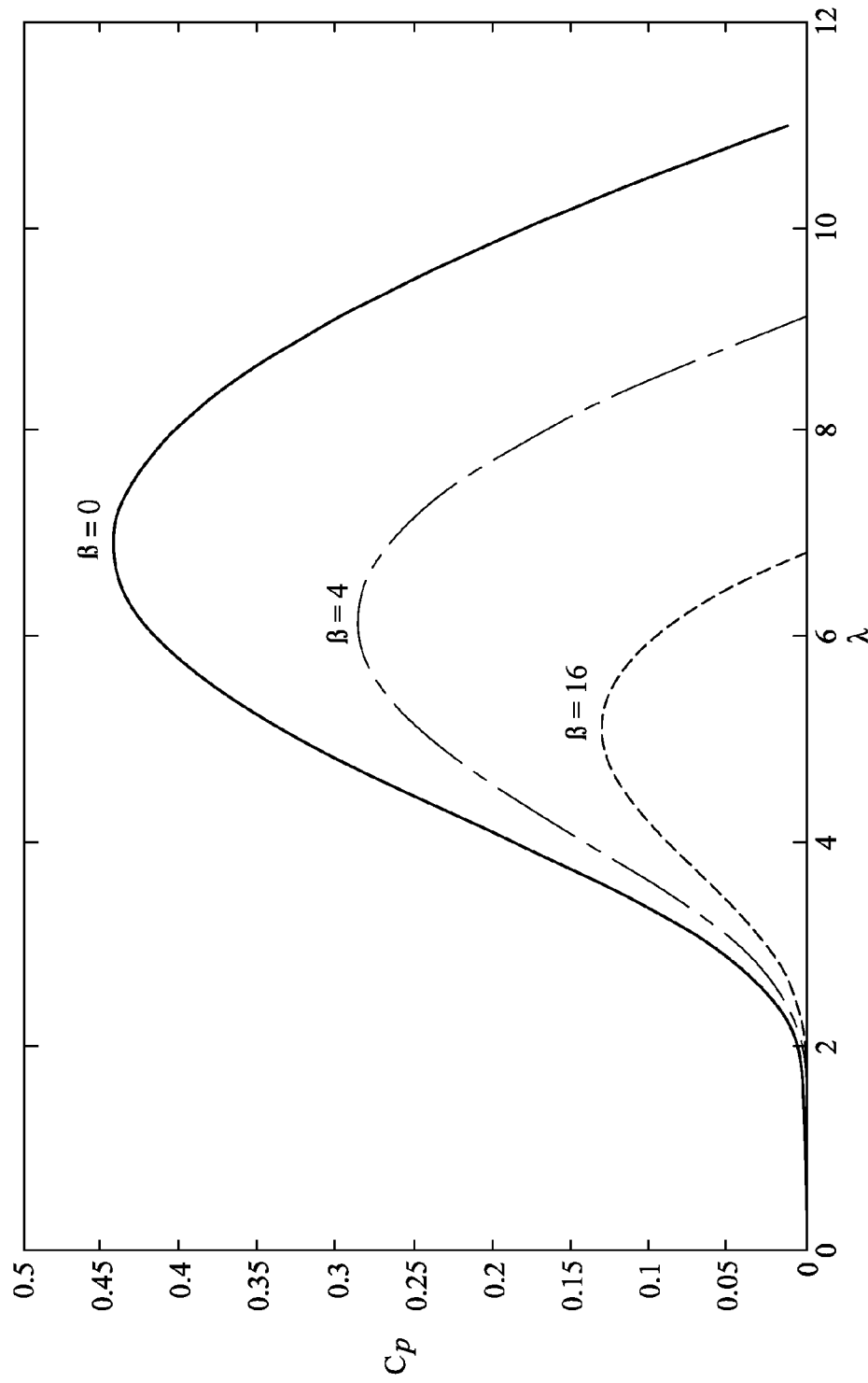
FIG. 2 is a diagram showing curves of $C_P$ versus $\lambda$.

Consequently, $C_p$ is can be expressed as a function of the TSR $\lambda$ and the blade pitch angle $\beta$, and is general defined by the following equation:

$$C_p = 0.73\left(\frac{151}{\lambda_i} - 0.58\beta - 0.002\beta^{2.14} - 13.2\right)e^{\frac{-18.4}{\lambda_i}} \qquad (3)$$

wherein $\lambda_i = ((\lambda - 0.02\beta)^{-1} - 3\times 10^{-3}(\beta^3+1)^{-1})^{-1}$ By using (3), the typical $C_p$ versus $\lambda$ curve is shown in FIG. 2. In a wind turbine, there is an optimum value of tip speed ratio $\lambda_{opt}$ that leads to maximum power coefficient $C_{p\ max}$. When $\beta=0$, the TSR in (2) can be adjusted to its optimum value with $\lambda_{opt}=6.9$, and with the power coefficient reaching $C_{p\ max}=0.4412$, the control objective of the maximum power extraction is arrived. From (1) and (2), we get $$P_{max} = \frac{1}{2\lambda_{opt}^3}\pi\rho C_{pmax} r^5 \omega_{opt}^3. \qquad (4)$$

This equation shows the relationship between the turbine power and turbine speed at maximum power output. When regulating the system under the specification of maximum power, it must be taken into account that turbine power must never be higher than generator rated power. Once generator rated power is reached at rated wind velocity, output power must be limited. For variable-speed wind turbine, a mechanical actuator is usually employed to change the pitch angle of the blades in order to reduce power coefficient and maintain the power at its rated value. For some wind turbines, when working with the maximum power coefficient, rated speed is obtained at a wind velocity lower than that of generator rated power.

Generally, the machine model of a PMSG can be described in the rotor rotating reference frame as following:

$$v_q = Ri_q + p\lambda_q + \omega_s\lambda_d;$$

$$v_q = Ri_q + p\lambda_q + \omega_s\lambda_d; \qquad (5)$$

and $$\lambda_q = L_q i_q;$$

$$\lambda_d = L_d i_d + L_{md} I_{fd};\qquad(6)$$

$$\omega_s = n_p \omega_r;\qquad(7)$$

wherein
$v_d$, $v_q$: d, q axis stator voltages
$i_d$, $i_q$: d, q axis stator currents
$L_d$, $L$: d, q axis stator inductances
$\lambda_d$, $\lambda$: d, q axis stator flux linkages
R: stator resistance
$\omega_s$: inverter frequency
$I_{fd}$: equivalent d-axis magnetizing current
$L_{md}$: d-axis mutual inductance
The electric torque and generator dynamics can be stated as:

$$T_e = 3n_p[L_{md}I_{fd}i_q + (L_d - L_q)i_d i_q]/2.\qquad(8)$$

Figure 3:
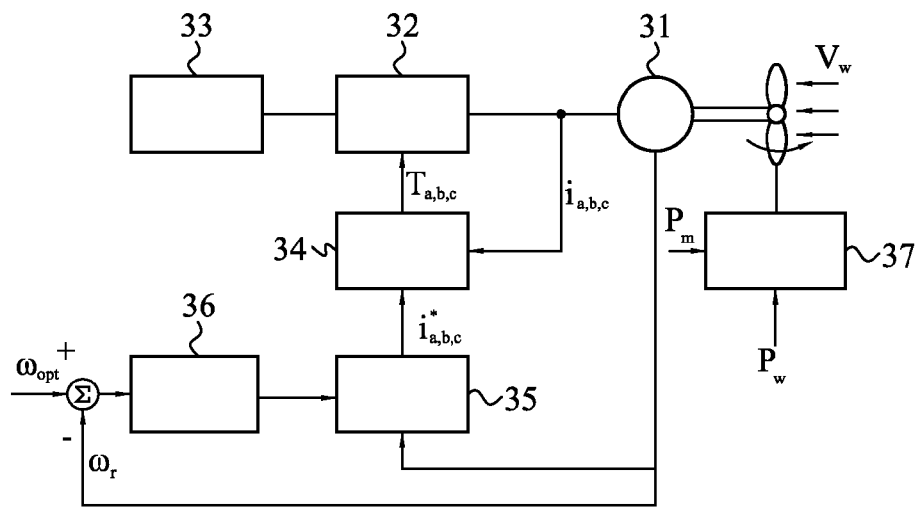
FIG. 3 shows a configuration of a field-oriented power generating system.

The configuration of a field-oriented PMSG system is shown in FIG. 3, which consists of: a PMSG 31, a current-controlled PWM voltage source converter (VSC) 32, an inverter 33, a current control 34, a coordinate translator 35, and a speed controller 36, and a pitch controller 37. By using field-oriented mechanism, the PMSG system can be reasonably represented by the control system block diagram shown in FIG. 4. In an embodiment, the present invention provides a novel hybrid intelligent control method for a permanent magnet synchronous generator, which comprises the steps of: using a fuzzy sliding mode speed controller 40 that is embedded with a fuzzy inference mechanism, for controlling the speed of a power generating apparatus; and using a radial basis function network (RBFN) pitch control system, that is embedded with an on-line training RBFN 41, for controlling the pitch angle of a turbine coupled to the power generating apparatus 42.

Figure 4:
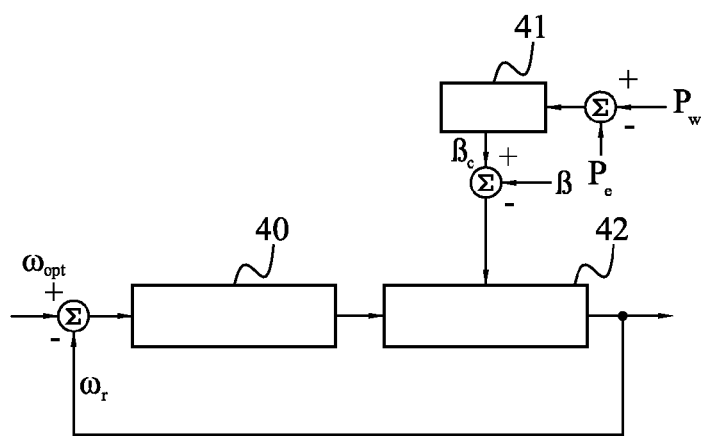
FIG. 4 is control system block diagram representing the field-oriented power generating system.

As shown in FIG. 4, there is a sliding mode speed controller 40 is proposed therein, whose state variables can be defined as following:

$$x_1(t) = \omega_{opt} - \omega_r(t);\text{ and}$$

$$\dot{x}_1(t) = -\dot{\omega}_r(t) = -x_2(t).$$

Accordingly, the PMSG system can be written in the following state-space form with $$\begin{bmatrix}\dot{x}_1(t)\\\dot{x}_2(t)\end{bmatrix} = \begin{bmatrix}0 & -1\\0 & -B/J\end{bmatrix}\begin{bmatrix}x_1(t)\\x_2(t)\end{bmatrix} + \begin{bmatrix}0\\-K_t/J\end{bmatrix}i_q^*(t) + \begin{bmatrix}0\\1/J\end{bmatrix}T_m.\qquad(9)$$

The above equation can be represented as:

$$\dot{X}(t) = AX(t) + BU(t) + D\dot{T}_m\qquad(10)$$

wherein $$A = \begin{bmatrix}0 & -1\\0 & -B/J\end{bmatrix};$$

$$B = \begin{bmatrix}0\\-K_t/J\end{bmatrix};$$

$$D = \begin{bmatrix}0\\1/J\end{bmatrix};$$

and $$U(t) = \dot{i}_q^*(t).$$

Consider equation (10) with uncertainties, we have:

$$\dot{X}(t) = (A + \Delta A)X(t) + (B + \Delta B)U(t) + (D + \Delta D)\dot{T}_m.\qquad(11)$$

wherein $\Delta A$, $\Delta B$ and $\Delta D$ are denoted as the uncertainties introduced by system parameters J, B, $K_t$, and mechanical torque $T_m$.
Reformulate equation (11), by $$\dot{X}(t) = AX(t) + B(U(t) + F(t))\qquad(12)$$

where F(t) is called the lumped uncertainty and is defined by $$F(t) = B^{-1}\Delta AX(t) + B^{-1}\Delta BU(t) + B^{-1}(D + \Delta D)\dot{T}_m.$$

According to (12), an integral-operation switching surface is designed directly from the nominal values of system parameters A and B.

Moreover, the switching surface with integral operation for the sliding mode speed controller is designed by the following equation:

$$S(t) = C[X(t) - \int_0^t (A + BK)X(\tau)d\tau] = 0\qquad(13)$$

wherein, C is set as a positive constant matrix; and
K is a state feedback gain matrix.
From equation (13), if the state trajectory of system equation (12) is trapped on the switching surface equation (13), namely $S(t) = \dot{S}(t) = 0$, then the equivalent dynamics of system equation (12) is governed by the following equation that:

$$\dot{X}(t) = (A + BK)X(t).\qquad(14)$$

From equation (14), the speed error $x_1(t)$ will converge to zero exponentially if the pole of system (14) is strategically located on the left-hand plane. Thus, the overshoot phenomenon will not occur, and the system dynamic will behave as a state feedback control system.

Based on the developed switching surface, a switching control law which satisfies the hitting condition and guarantees the existence of the sliding mode is then designed. Now a speed controller can be proposed by the following equation:

$$U(t) = KX(t) - f\,sgn(S(t));\qquad(15)$$

wherein, sgn(•) is a sign function defined as:

$$sgn(S(t)) = \begin{cases}+1 & \text{if } S(t) > 0\\-1 & \text{if } S(t) < 0;\end{cases}$$

and'
f is defined as $|F(t)| \le f$.
In the general sliding mode control, the upper bound of uncertainties, which include parameter variations and external mechanical disturbance, must be available. However, the bound of the uncertainties is difficult to obtain in advance for practical applications. Therefore, a fuzzy estimation technique is proposed here, in which a fuzzy inference mechanism is used to estimate the upper bound of the lumped uncertainty.

Figure 5:
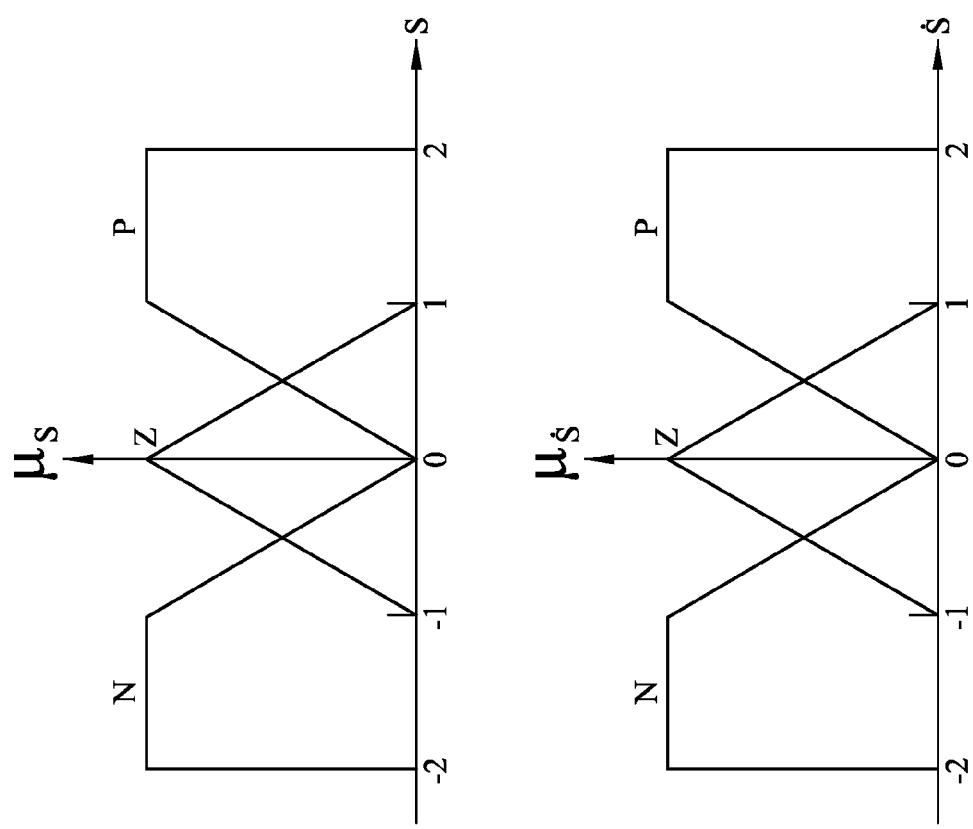
FIG. 5 are diagrams showing membership functions for the fuzzy sets corresponding to switching surface $S, \dot{S}$.

Consequently, by replacing f by $K_f$ in equation (15), the following equation can be obtained:

$$U(t) = KX(t) - K_f sgn(S(t));\qquad(16)$$

where $K_f$ is estimated by fuzzy inference mechanism.
Please refer to FIG. 5, which are diagrams showing membership functions for the fuzzy sets corresponding to switching surface S, $\dot{S}$. As shown in FIG. 5, their universe of discourses are all assigned to be [−2, 2], where the fuzzy control rules are defined by:

| | | |
|---|---|---|
| N: Negative | ZE, Z: Zero | P: Positive |
| NH: Negative Huge | NB: Negative Big | NM: Negative Medium |
| NS: Negative Small | PH: Positive Hug | PS: Positive Small |
| PM: Positive Medium | PB: Positive Big | PH: Positive Huge |

Since only three fuzzy subsets, N, Z and P, are defined for S and Ṡ, the fuzzy inference mechanism only contains nine rules defined in Table 1, as following:

TABLE 1

| | | Ṡ | | |
|---|---|---|---|---|
| $K_f$ | | P | Z | N |
| S | P | NH (−1.5) | NB (−1) | NM (−0.5) |
| | Z | NS (−0.05) | ZE (0) | PS (0.05) |
| | N | PM (0.5) | PB (1) | PH (1.5) |

For example, Rule 1 is the condition that S is far away from the switching surface and Ṡ is also positive, so a large $K_f$ is required for the sliding mode. Rule 5 implies that S is on the switching surface and Ṡ is zero, so only very small $K_f$ is required for the sliding mode. Similar analysis can be used to explain other fuzzy rules.

Fuzzy output $K_f$ can be calculated by the center of gravity (COG) defuzzifier by the following equation:

$$K_f = \frac{\sum_{i=1}^{9} w_i c_i}{\sum_{i=1}^{9} w_i} = \frac{[c_1 \ldots c_9]\begin{bmatrix} w_1 \\ \vdots \\ w_9 \end{bmatrix}}{\sum_{i=1}^{9} w_i} = \upsilon^T W; \quad (17)$$

wherein $\upsilon=[c_1, \ldots, c_9]$ is the adjustable parameter vector; $c_1$ through $c_9$ are the center of the membership functions of $K_f$;

$$W = \frac{[w_1, \ldots, w_9]}{\sum_{i=1}^{9} w_i}$$

is a fired strength vector.

Figure 6A:
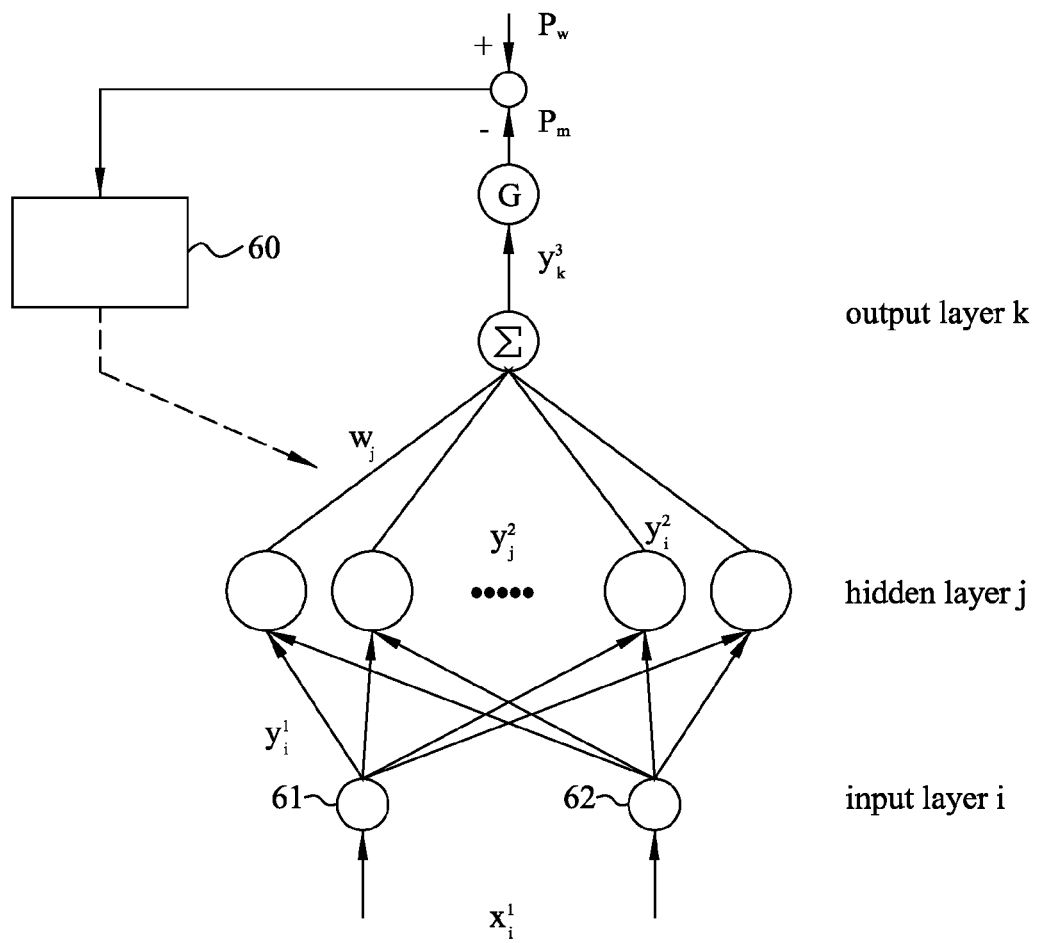
FIG. 6A shows a three-layer neural network used in the pitch controller of the present invention.

Please refer to FIG. 6A, which shows a three-layer neural network used in the pitch controller of the present invention. In FIG. 6A, a three-layer neural network is disclosed, which can be adopted to be used in the proposed RBFN pitch controller 41 of FIG. 4 for the PMSG, where the control law $\beta_c$ is generated, and $x_1^1 = P_w - P_m = e$ 61 and $x_2^1 = \dot{e}$ 62. In the proposed RBFN, the units in the input, hidden, and output layers can be two, nine and one in respective, for example.

In the input layer of FIG. 6A, the nodes in this layer are used to directly transmit the numerical inputs to the next layer. The net input and output are represented as following:

$$net_i^1 = x_i^1(N);$$

$$y_i^1(N) = f_i^1(net_i^1(N)) = net_i^1(N); \, i=1,2. \quad (18)$$

In the hidden layer, every node performs a Gaussian function. The Gaussian function, a particular example of radial basic functions, is used here as a membership function. Then, $$net_j^2(N) = -(X-M_j)^T \Sigma_j (X-M_j);$$

$$y_j^2(N) = f_j^2(net_j^2(N)) = \exp(net_j^2(N)); \, j=1,\ldots,9;$$

wherein $$M_j = [m_{1j} m_{2j} \ldots m_{ij}]^T; \text{ and} \quad (19)$$

$\Sigma_j = \text{diag}[1/\sigma_{1j}^2 \; 1/\sigma_{2j}^2 \ldots 1/\sigma_{ij}^2]^T$ denotes the mean and the standard deviation, STD, of the Gaussian function.

For the output layer, the single node k in this layer is denoted by $\Sigma$, which computes the overall output as the summation of all incoming signals by the following equation:

$$net_k^3 = \sum_j w_j y_j^2(N); \quad (20)$$

$$y_k^3(N) = f_k^3(net_k^3(N)) = net_k^3(N) = \beta_c;$$

wherein, $w_j$ are the connective weight between the hidden and the output layers.

It is noted that the aforesaid three-layer RBFN is a supervised learning and training process. Once the RBFN has been initialized, a supervised learning law 60 of gradient descent is used to train this system. The derivation is the same as that of the back-propagation algorithm. It is employed to adjust the parameters $m_{ij}$, $\sigma_{ij}$, and $w_j$ of the RBFN by using the training patterns. By recursive application of the chain rule, the error term for each layer is calculated, and updated. The purpose of supervised learning is to minimize the error function E expressed as following:

$$E = \tfrac{1}{2}(P_w - P_m)^2; \quad (21)$$

where $P_w$ and $P_m$ represent the wind power and the turbine output power.

In the output layer, the weight $w_j$ is updated. In this layer, the error term to be propagated is given by:

$$\delta_k = -\frac{\partial E}{\partial net_k^3} = \left[-\frac{\partial E}{\partial y_k^3}\frac{\partial y_k^3}{\partial net_k^4}\right]; \quad (22)$$

then, the weight $w_j$ is adjusted by the amount $$\Delta w_j = -\frac{\partial E}{\partial w_j} = \left[-\frac{\partial E}{\partial y_k^3}\frac{\partial y_k^3}{\partial net_k^3}\right]\left(\frac{\partial net_k^3}{\partial w_j}\right) = \delta_k y_j^2; \quad (23)$$

hence, the weight can be updated by the equation:

$$w_j(N+1) = w_j(N) + \eta_w \Delta w_j(N);$$

wherein, $\eta_w$ is the learning rate for adjusting the parameter $w_j$.

In the hidden layer, $m_{ij}$ and $\sigma_{ij}$ are updated. In this layer, the multiplication operation is done in this layer. The adaptive rule for $m_{ij}$ is $$\Delta m_{ij} = -\frac{\partial E}{\partial m_{ij}} = \left[-\frac{\partial E}{\partial net_k^3}\frac{\partial net_k^3}{\partial y_j^2}\frac{\partial y_j^2}{\partial m_{ij}}\right] = \delta_k w_j y_j^2 \frac{2(x_i^1 - m_{ij})}{(\sigma_{ij})^2}; \quad (25)$$

and, the adaptive rule for $\sigma_{ij}$ is:

$$\Delta \sigma_{ij} = -\frac{\partial E}{\partial \sigma_{ij}} = \left[-\frac{\partial E}{\partial net_k^3}\frac{\partial net_k^3}{\partial y_j^2}\frac{\partial y_j^2}{\partial \sigma_{ij}}\right] = \delta_k w_j y_i^2 \frac{2(x_i^1 - m_{ij})^2}{(\sigma_{ij})^3}; \quad (26)$$

Thus the updated rules for $m_{ij}$ and $\sigma_{ij}$ are $$m_{ij}(k+1) = m_{ij}(k) + \eta_m \Delta m_{ij};$$

$$\sigma_{ij}(k+1) = \sigma_{ij}(k) + \eta_\sigma \Delta \sigma_{ij}; \quad (27)$$

where $\eta_m$ and are the learning rates for adjusting the parameters $m_{ij}$ and $\sigma_{ij}$, respectively.

With tuning parameters $m_{ij}$, $\sigma_{ij}$, and $w_j$, we can derive a learning algorithm that drives E to zero.

Figure 6B:
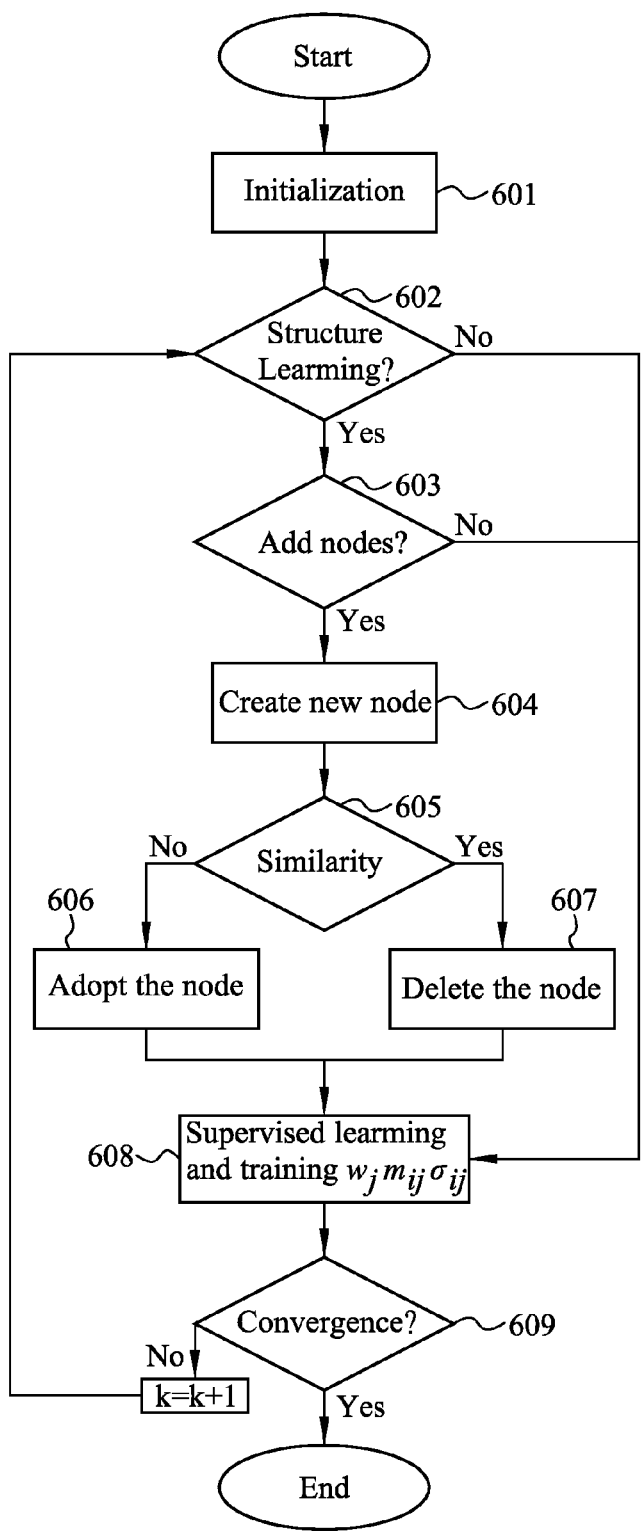
FIG. 6B is a flow chart depicting the steps performed in an on-line training RBFN that is embedded in a RBFN pitch controller of the present invention.

Please refer to FIG. 6B, which is a flow chart depicting the steps performed in an on-line training RBFN that is embedded in a RBFN pitch controller of the present invention. As shown in FIG. 6B, operationally, the performing of the on-line training RBFN starts from the step 601. At step 601, an initialization process is enabled to be performed upon variables used in the RBFN, and then the flow proceeds to step 602. At step 602, an evaluation is performed for determining whether or not to perform a structure learning process; and if so, the flow proceeds to step 603; otherwise, the flow proceeds to step 608. It is noted that the structure learning is used to find proper input space fuzzy partitions and fuzzy logic rules subject to minimize the number of rules generated and the number of fuzzy sets on the universe of discourse of each input variable, and in an embodiment, the structure learning process is enabled if $x_1 > e_{min}$ or $\dot{x}_1 > \Delta e_{min}$. At step 603, an evaluation is made for whether or not to add a new membership function node, if so, the flow proceeds to step 604, otherwise the flow proceeds to step 608. At step 604, a new node is created; and then the flow proceeds to step 605. At step 605, a similarity test is performed for comparing the newly created node with other nodes; and if the newly created node passes the similarity test, the flow proceeds to step 606; otherwise, the flow proceeds to step 607. At step 606, the newly created node is adopted; and then the flow proceeds to step 608. At step 607, the newly created node is deleted; and then the flow proceeds to step 608. At step 608, a supervised learning process is enabled for training the $m_{ij}$, $\sigma_{ij}$, and $w_j$; and then the flow proceeds to step 609. At step 609, an convergence test is performed for determining whether the error function E is minimized; if so, the flow stops; otherwise, the flow proceeds back to step 602 for starting a new iteration.

To sum up, the present invention provides a novel hybrid intelligent control system and method for a permanent magnet synchronous generator (PMSG), adapted for enabling a wind turbine that is coupled to the PMSG to operate at its maximum efficiency by adjusting its blade pitch angle in response to the variation of wind, while allowing the speed of the PMSG to be controlled by a fuzzy interference mechanism so as to achieve its maximum power output. That is, by the control method of the present invention, the controlled rotor speed, the actual turbine power $P_m$ and the generator power $P_e$ can track the desired $P_w$ closely, and thus not only the maximal wind energy can be captured, but also the system stability can be maintained while allowing the desired performance to be reached even with parameter uncertainties.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A hybrid intelligent control system for power generating apparatuses, wherein the hybrid intelligent control system is implemented by an executable program stored in a non-transitory computer-readable storage medium, comprising:
a fuzzy sliding mode speed controller, being embedded with a fuzzy inference mechanism so as to be used for controlling the speed of a power generating apparatus; and
a radial basis function network (RBFN) pitch controller, being embedded with an on-line training RBFN so as to be used for controlling the pitch angle of a turbine coupled to the power generating apparatus;
wherein, the turbine is enabled to be driven to operate at its maximum efficiency by adjusting its blade pitch angle in response to the variation of an input flowing into the turbine, while allowing a shaft speed of the power generating apparatus to be controlled by the fuzzy inference mechanism so as to achieve its maximum power output.

2. The hybrid intelligent control system of claim 1, wherein the turbine is substantially a variable-speed wind turbine, whose output mechanical power available is expressed as:

$$P_m = \tfrac{1}{2}\rho A C_p(\lambda,\beta) V_\omega^3;$$

whereas $\rho$ and A are air density and the area swept by blades, respectively;
$V_\omega$ is the wind velocity (m/sec); and
$C_p$ is called the power coefficient;
and, the power generating apparatus is substantially a three-phase PMSG, where the mechanical torque ($T_m$) and electrical torque ($T_e$) can be expressed as:

$$T_m = \frac{P_m}{\omega_r}; \text{ and}$$

$$T_e = \frac{P_e}{\omega_e} = \frac{2}{n_p}\frac{P_e}{\omega_r};$$

and thus, in general, the mechanical dynamic equation of the PMSG is given by:

$$J\frac{d\omega_r}{dt} = T_m - B\omega_r - T_e;$$

wherein, $\omega_e$ represents electrical angular frequency;
$n_p$ represent the number of poles;
J is the inertia moment of WTG; and
B is the friction coefficient of the PMSG.

3. The hybrid intelligent control system of claim 2, wherein the power coefficient $C_p$ is given as a nonlinear function of the tip speed ratio (TSR) $\lambda$ in an equation:

$$\lambda = \frac{\omega_r r}{V_\omega},$$

whereas, r is the wind turbine blade radius,
$\omega_r$ is the turbine speed; and
consequently, $C_p$ is a function of the TSR $\lambda$ and the blade pitch angle $\beta$, so that is defined by the following equations:

$$C_p = 0.73\left(\frac{151}{\lambda_i} - 0.58\beta - 0.002\beta^{2.14} - 13.2\right)e^{\frac{-18.4}{\lambda_i}};$$

wherein $$\lambda_i = ((\lambda - 0.02\beta)^{-1} - 3\times 10^{-3}(\beta^3+1)^{-1})^{-1}$$

and thus, there is an optimum value of tip speed ratio $\lambda_{opt}$ that leads to maximum power coefficient $C_{p\,max}$, and when $\beta=0$, the TSR can be adjusted to its optimum value with $\lambda_{opt}=6.9$, and with the power coefficient reaching $C_{p\,max}=0.4412$, the maximum power extraction of the turbine is arrived in a following form:

$$P_{max} = \frac{1}{2\lambda_{opt}^3}\pi\rho C_{pmax} r^5 \omega_{opt}^3.$$

4. The hybrid intelligent control system of claim 2, wherein the fuzzy inference mechanism is performed based upon the designing of a switching surface and a fuzzy parameter $K_f$, while the switching surface with integral operation for the sliding mode speed controller is designed based upon the following equation:

$$S(t)=C[X(t)-\int_0^t(A+BK)X(\tau)d\tau]=0;$$

whereas, C is set as a positive constant matrix, and
K is a state feedback gain matrix;
and the fuzzy parameter $K_f$ can be calculated by the center of gravity (COG) defuzzifier by the following equation:

$$K_f = \frac{\sum_{i=1}^{9} w_i c_i}{\sum_{i=1}^{9} w_i} = \frac{[c_1 \ \ldots \ c_9]\begin{bmatrix} w_1 \\ \vdots \\ w_9 \end{bmatrix}}{\sum_{i=1}^{9} w_i} = \upsilon^T W;$$

whereas $\upsilon=[c_1, \ldots, c_9]$ is the adjustable parameter vector;
$c_1$ through $c_9$ are the center of the membership functions of $K_f$;

$$W = \frac{[w_1, \ \ldots, \ w_9]}{\sum_{i=1}^{9} w_i}$$

is a fired strength vector;
and consequently, the fuzzy inference mechanism is governed by an equation:

$$U(t)=KX(t)-K_f sgn(S(t));$$

where sgn(•) is a sign function defined as:

$$sgn(S(t)) = \begin{cases} +1 & \text{if } S(t) > 0 \\ -1 & \text{if } S(t) < 0. \end{cases}$$

5. The hybrid intelligent control system of claim 2, wherein the pitch controller further comprises:
a mechanical actuator, for adjusting the pitch angle of the turbine under the regulation of the on-line training RBFN while maintaining the corresponding mechanical power outputted from the turbine at its rated value without violating a condition that the turbine power must never be higher than the PMSG rated power.

6. The hybrid intelligent control system of claim 1, wherein the RBFN used in the procedure of RBFN is a three-layer neural network process, which are an input layer, a hidden layer and an output layer.

7. The hybrid intelligent control system of claim 6, wherein for the input layer, the basic node operation is performed in a manner that the nodes in this layer are used to directly transmit the numerical inputs to the next layer, and the net input and output are represented as:

$$net_i^1=x_i^1(N); \text{ and}$$

$$y_i^1(N)=f_i^1(net_i^1(N))=net_i^1(N);$$

whereas, $net_i^1$ is the node function of the input layer;
$x_i^1$ represents the input signal of the input layer, can be voltage, current or temperature;
$y_i^1$ represents the output signal of the input layer;
$f_i^1$ represents the conversion function of the input layer; and
N represents the number of iteration performed in the on-line training RBFN.

8. The hybrid intelligent control system of claim 6, wherein for the hidden layer, the basic node operation is performed in a manner that every node is enabled to perform a function selected from the group consisting of: a Gaussion function, a Linear function, a Logic function and a Exponential function.

9. The hybrid intelligent control system of claim 6, wherein for the hidden layer, the basic node operation is performed in a manner that every node performs a Gaussian function that is used as a membership function, and thus the net input and output of the hidden layer are represented as:

$$net_j^2(N)=-(X-M_j)^T\Sigma_j(X-M_j); \text{ and}$$

$$y_j^2(N)=f_j^2(net_j^2(N))=\exp(net_j^2(N)), j=1,\ldots,9;$$

whereas, $M_j=[m_{1j} \ m_{2j} \ \ldots \ m_{ij}]^T$ denotes the mean of the Gaussian function;
$\Sigma_j=\text{diag}[1/\sigma_{1j}^2 \ 1/\sigma_{2j}^2 \ \ldots \ 1/\sigma_{ij}^2]^T$ denotes the STD of the Gaussian function;
$net_i^2$ is the node function of the hidden layer;
$x_i^2$ represents the input signal of the hidden layer; and
$y_i^2$ represents the output signal of the hidden layer.

10. The hybrid intelligent control system of claim 6, wherein for the output layer, the basic node operation is performed in a manner that the single node k in this layer is denoted by $\Sigma$, which computes the overall output as the summation of all incoming signals by:

$$net_k^3 = \sum_j w_j y_j^2(N);$$

and $$y_k^3(N)=f_k^3(net_k^3(N))=net_k^3(N)=\beta_c;$$

whereas, $w_j$ are the connective weight between the hidden and the output layers.

11. The hybrid intelligent control system of claim 5, wherein the on-line training RBFN is a supervised learning and training process, and in a recursive step using a back-propagation algorithm that is performed in the supervised learning and training process, the parameters $m_{ij}$, $\sigma_{ij}$, and $w_j$ are modified and updated according to a low of gradient descent while using the same that is being recursively modified for minimizing an error function E that is expressed as:

$$E=\tfrac{1}{2}(P_w-P_m)^2;$$

whereas, $P_w$ and $P_m$ represent the input power and the turbine output power.

12. The hybrid intelligent control system of claim 11, wherein for updating the parameters $w_j$ in the output layer, an error term is calculated and thus to be propagated in an equation:

$$\delta_k = -\frac{\partial E}{\partial net_k^3} = -\left[\frac{\partial E}{\partial y_k^3}\frac{\partial y_k^3}{\partial net_k^4}\right];$$

then, the weight can be updated by the following equation:

$$w_j(N+1)=w_j(N)+\eta_w\Delta w_j(N);$$

whereas, $\eta_w$ is the learning rate for adjusting the parameter $w_j$.

13. The hybrid intelligent control system of claim 11, wherein for updating the parameters $m_{ij}$ and $\sigma_{ij}$ in the hidden layer, the parameters $m_{ij}$ is updated using an adaptive rule as following:

$$\Delta m_{ij} = -\frac{\partial E}{\partial m_{ij}} = \left[-\frac{\partial E}{\partial net_k^3}\frac{\partial net_k^3}{\partial y_j^2}\frac{\partial y_j^2}{\partial m_{ij}}\right] = \delta_k w_j y_j^2 \frac{2(x_i^1 - m_{ij})}{(\sigma_{ij})^2};$$

and the parameters $\sigma_{ij}$ is updated using an adaptive rule as following:

$$\Delta \sigma_{ij} = -\frac{\partial E}{\partial \sigma_{ij}} = \left[-\frac{\partial E}{\partial net_k^3}\frac{\partial net_k^3}{\partial y_j^2}\frac{\partial y_j^2}{\partial \sigma_{ij}}\right] = \delta_k w_j y_i^2 \frac{2(x_i^1 - m_{ij})^2}{(\sigma_{ij})^3};$$

resulting that the updated rules for $m_{ij}$ and $\sigma_{ij}$ are defined by the following equations:

$m_{ij}(k+1) = m_{ij}(k) + \eta_m \Delta m_{ij}$; and $\sigma_{ij}(k+1) = \sigma_{ij}(k) + \eta_\sigma \Delta \sigma_{ij}$;

whereas $\eta_m$ and $\eta_\sigma$ are the learning rates for adjusting the parameters $m_{ij}$ and $\sigma_{ij}$, respectively.

14. The hybrid intelligent control system of claim 11, wherein the performing of the on-line training RBFN comprises the steps of:
  (a) step 601: an initialization process is enabled to be performed upon variables used in the RBFN, and then the flow proceeds to step 602;
  (b) step 602: an evaluation is performed for determining whether or not to perform a structure learning process; and if so, the flow proceeds to step 603; otherwise, the flow proceeds to step 608;
  (c) step 603: an evaluation is made for whether or not to add a new membership function node, if so, the flow proceeds to step 604, otherwise the flow proceeds to step 608;
  (d) step 604: a new node is created; and then the flow proceeds to step 605;
  (e) step 605: a similarity test is performed for comparing the newly created node with other nodes; and if the newly created node passes the similarity test, the flow proceeds to step 606; otherwise, the flow proceeds to step 607;
  (f) step 606: the newly created node is adopted; and then the flow proceeds to step 608;
  (g) step 607: the newly created node is deleted; and then the flow proceeds to step 608;
  (h) step 608: a supervised learning process is enabled for training the $m_{ij}$, $\sigma_{ij}$, and $w_j$; and then the flow proceeds to step 609; and
  (i) step 609: an convergence test is performed for determining whether the error function E is minimized; if so, the flow stops; otherwise, the flow proceeds back to step 602 for starting a new iteration.

15. The hybrid intelligent control system of claim 14, wherein the structure learning process is enabled if $x_1$ is larger than a specific value or $\dot{x}_1$ is larger than the specific value.

16. A hybrid intelligent control method, implemented by an executable program stored in a non-transitory computer-readable storage medium, comprising the steps of:
  using a fuzzy sliding mode speed controller that is embedded with a fuzzy inference mechanism, for controlling the speed of a power generating apparatus; and
  using a radial basis function network (RBFN) pitch controller, that is embedded with an on-line training RBFN, for controlling the pitch angle of a turbine coupled to the power generating apparatus.

17. The hybrid intelligent control method of claim 16, wherein the fuzzy inference mechanism is performed based upon the designing of a switching surface and a fuzzy parameter $K_f$, while the switching surface with integral operation for the sliding mode speed controller is designed based upon the following equation:

$S(t) = C[X(t) - \int_0^t (A+BK)X(\tau)d\tau] = 0$;

whereas, C is set as a positive constant matrix, and
K is a state feedback gain matrix;
and the fuzzy parameter $K_f$ can be calculated by the center of gravity (COG) defuzzifier by the following equation:

$$K_f = \frac{\sum_{i=1}^{9} w_i c_i}{\sum_{i=1}^{9} w_i} = \frac{[c_1 \ \ldots \ c_9]\begin{bmatrix}w_1 \\ \vdots \\ w_9\end{bmatrix}}{\sum_{i=1}^{9} w_i} = \upsilon^T W;$$

whereas $\upsilon = [c_1, \ldots, c_9]$ is the adjustable parameter vector; $c_1$ through $c_9$ are the center of the membership functions of $K_f$;

$$W = \frac{[w_1, \ \ldots, \ w_9]}{\sum_{i=1}^{9} w_i}$$

is a fired strength vector;
and consequently, the fuzzy inference mechanism is governed by an equation:

$U(t) = KX(t) - K_f sgn(S(t))$;

whereas $sgn(\bullet)$ is a sign function defined as:

$$sgn(S(t)) = \begin{cases} +1 & \text{if } S(t) > 0 \\ -1 & \text{if } S(t) < 0. \end{cases}$$

18. The hybrid intelligent control method of claim 16, wherein the pitch controller further comprises:
  a mechanical actuator, for adjusting the pitch angle of the turbine under the regulation of the on-line training RBFN while maintaining the corresponding mechanical power outputted from the turbine at its rated value without violating a condition that the turbine power must never be higher than the PMSG rated power.

19. The hybrid intelligent control method of claim 16, wherein the RBFN used in the procedure of RBFN is a three-layer neural network process, which are an input layer, a hidden layer and an output layer.

20. The hybrid intelligent control method of claim 19, wherein for the input layer, the basic node operation is performed in a manner that the nodes in this layer are used to directly transmit the numerical inputs to the next layer, and the net input and output are represented as:

$net_i^1 = x_i^1(N)$; and $y_i^1(N) = f_i^1(net_i^1(N)) = net_i^1(N)$;

whereas, $\text{net}_i^1$ is the node function of the input layer;

$x_i^1$ represents the input signal of the input layer, can be voltage, current or temperature;

$y_i^1$ represents the output signal of the input layer;

$f_i^1$ represents the conversion function of the input layer; and

N represents the number of iteration performed in the on-line training RBFN.

21. The hybrid intelligent control method of claim 19, wherein for the hidden layer, the basic node operation is performed in a manner that every node is enabled to perform a function selected from the group consisting of: a Gaussion function, a Linear function, a Logic function and a Exponential function.

22. The hybrid intelligent control method of claim 19, wherein for the hidden layer, the basic node operation is performed in a manner that every node performs a Gaussian function that is used as a membership function, and thus the net input and output of the hidden layer are represented as:

$$\text{net}_j^2(N) = -(X-M_j)^T \Sigma_j (X-M_j); \text{ and}$$

$$y_j^2(N) = f_j^2(\text{net}_j^2(N)) = \exp(\text{net}_j^2(N)), j=1, \ldots, 9;$$

whereas, $M_j = [m_{1j} \; m_{2j} \; \ldots \; m_{ij}]^T$ denotes the mean of the Gaussian function;

$\Sigma_j = \text{diag}[1/\sigma_{1j}^2 \; 1/\sigma_{2j}^2 \ldots 1/\sigma_{ij}^2]^T$ denotes the STD of the Gaussian function;

$\text{net}_i^2$ is the node function of the hidden layer;

$x_i^2$ represents the input signal of the hidden layer; and $y_i^2$ represents the output signal of the hidden layer.

23. The hybrid intelligent control method of claim 19, wherein for the output layer, the basic node operation is performed in a manner that the single node k in this layer is denoted by $\Sigma$, which computes the overall output as the summation of all incoming signals by:

$$\text{net}_k^3 = \sum_j w_j y_j^2(N);$$

and $$y_k^3(N) = f_k^3(\text{net}_k^3(N)) = \text{net}_k^3(N) = \beta_c;$$

whereas, $w_j$ are the connective weight between the hidden and the output layers.

24. The hybrid intelligent control method of claim 18, wherein the on-line training RBFN is a supervised learning and training process, and in a recursive step using a back-propagation algorithm that is performed in the supervised learning and training process, the parameters $m_{ij}$, $\sigma_{ij}$, and $w_j$ are modified and updated according to a low of gradient descent while using the same that is being recursively modified for minimizing an error function E that is expressed as:

$$E = \tfrac{1}{2}(P_w - P_m)^2;$$

whereas, $P_w$ and $P_m$ represent the input power and the turbine output power.

25. The hybrid intelligent control method of claim 24, wherein or updating the parameters $w_j$, in the output layer, an error term is calculated and thus to be propagated in an equation:

$$\delta_k = -\frac{\partial E}{\partial \text{net}_k^3} = \left[-\frac{\partial E}{\partial y_k^3} \frac{\partial y_k^3}{\partial \text{net}_k^4}\right];$$

then, the weight can be updated by the following equation:

$$w_j(N+1) = w_j(N) + \eta_w \Delta w_j(N);$$

whereas, $\eta_w$ is the learning rate for adjusting the parameter $w_j$.

26. The hybrid intelligent control method of claim 24, wherein for updating the parameters $m_{ij}$ and $\sigma_{ij}$ in the hidden layer, the parameters $m_{ij}$ is updated using an adaptive rule as following:

$$\Delta m_{ij} = -\frac{\partial E}{\partial m_{ij}} = \left[-\frac{\partial E}{\partial \text{net}_k^3} \frac{\partial \text{net}_k^3}{\partial y_j^2} \frac{\partial y_j^2}{\partial m_{ij}}\right] = \delta_k w_j y_j^2 \frac{2(x_i^1 - m_{ij})}{(\sigma_{ij})^2};$$

and the parameters $\sigma_{ij}$ is updated using an adaptive rule as following:

$$\Delta \sigma_{ij} = -\frac{\partial E}{\partial \sigma_{ij}} = \left[-\frac{\partial E}{\partial \text{net}_k^3} \frac{\partial \text{net}_k^3}{\partial y_j^2} \frac{\partial y_j^2}{\partial \sigma_{ij}}\right] = \delta_k w_j y_i^2 \frac{2(x_i^1 - m_{ij})^2}{(\sigma_{ij})^3};$$

resulting that the updated rules for $m_{ij}$ and $\sigma_{ij}$ are defined by the following equations:

$$m_{ij}(k+1) = m_{ij}(k) + \eta_m \Delta m_{ij}; \text{ and}$$

$$\sigma_{ij}(k+1) = \sigma_{ij}(k) + \eta_\sigma \Delta \sigma_{ij};$$

whereas $\eta_m$ and $\eta_\sigma$ are the learning rates for adjusting the parameters $m_{ij}$ and $\sigma_{ij}$, respectively.

27. The hybrid intelligent control method of claim 24, wherein the performing of the on-line training RBFN comprises the steps of:
(a) step 601: an initialization process is enabled to be performed upon variables used in the RBFN, and then the flow proceeds to step 602;
(b) step 602: an evaluation is performed for determining whether or not to perform a structure learning process; and if so, the flow proceeds to step 603; otherwise, the flow proceeds to step 608;
(c) step 603: an evaluation is made for whether or not to add a new membership function node, if so, the flow proceeds to step 604, otherwise the flow proceeds to step 608;
(d) step 604: a new node is created; and then the flow proceeds to step 605;
(e) step 605: a similarity test is performed for comparing the newly created node with other nodes; and if the newly created node passes the similarity test, the flow proceeds to step 606; otherwise, the flow proceeds to step 607;
(f) step 606: the newly created node is adopted; and then the flow proceeds to step 608;
(g) step 607: the newly created node is deleted; and then the flow proceeds to step 608;
(h) step 608: a supervised learning process is enabled for training the $m_{ij}$, $\sigma_{ij}$, and $w_j$; and then the flow proceeds to step 609; and
(i) step 609: an convergence test is performed for determining whether the error function E is minimized; if so, the flow stops; otherwise, the flow proceeds back to step 602 for starting a new iteration.

28. The hybrid intelligent control method of claim 27, wherein the structure learning process is enabled if $x_1$ is larger than a specific value or $\dot{x}_1$ is larger than the specific value.

* * * * *